(12) United States Patent
Miyagawa et al.

(10) Patent No.: US 10,585,370 B2
(45) Date of Patent: Mar. 10, 2020

(54) CHARGING MEMBER, PROCESS CARTRIDGE, AND ELECTROPHOTOGRAPHIC IMAGE FORMING APPARATUS

(71) Applicant: CANON KABUSHIKI KAISHA, Tokyo (JP)

(72) Inventors: Noboru Miyagawa, Suntou-gun (JP); Hidekazu Matsuda, Susono (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/149,558

(22) Filed: Oct. 2, 2018

(65) Prior Publication Data

US 2019/0033746 A1    Jan. 31, 2019

Related U.S. Application Data

(60) Division of application No. 14/257,990, filed on Apr. 21, 2014, now abandoned, which is a continuation of application No. PCT/JP2013/007550, filed on Dec. 24, 2013.

(30) Foreign Application Priority Data

Dec. 27, 2012 (JP) ................................ 2012-285241

(51) Int. Cl.
| | |
|---|---|
| *G03G 15/02* | (2006.01) |
| *G03G 21/18* | (2006.01) |
| *C08K 5/053* | (2006.01) |
| *C08K 5/132* | (2006.01) |

(52) U.S. Cl.
CPC ......... *G03G 15/02* (2013.01); *G03G 15/0233* (2013.01); *G03G 21/18* (2013.01); *C08K 5/053* (2013.01); *C08K 5/132* (2013.01); *Y10T 428/2947* (2015.01)

(58) Field of Classification Search
CPC ..... G03G 15/02–0291; G03G 15/0233; G03G 21/18; Y10T 428/2947
See application file for complete search history.

(56) References Cited

U.S. PATENT DOCUMENTS

| | | | |
|---|---|---|---|
| 7,067,608 | B2 | 6/2006 | Bender |
| 7,544,158 | B2 | 6/2009 | Yamada et al. |
| 9,632,446 | B2 | 4/2017 | Matsuda et al. |
| 2003/0022082 | A1 | 1/2003 | Ohmura et al. |

(Continued)

FOREIGN PATENT DOCUMENTS

| | | |
|---|---|---|
| CN | 1151536 | 6/1997 |
| JP | H03-101738 | 4/1991 |

(Continued)

*Primary Examiner* — Ramsey Zacharia
(74) *Attorney, Agent, or Firm* — Venable LLP

(57) ABSTRACT

In order to maintain the image quality of a recent high-speed electrophotographic apparatus, a charging member is provided which hardly causes charging unevenness of a photosensitive member even when vibration of the photosensitive member occurs. The charging member includes an electro-conductive support, an electro-conductive elastic layer, and a surface layer. The elastic layer contains a resin having an epichlorohydrin chain in the molecular structure and a specific flavonoid compound having two or more hydroxyl groups in the molecular structure.

5 Claims, 3 Drawing Sheets

(56) References Cited

U.S. PATENT DOCUMENTS

| | | | |
|---|---|---|---|
| 2006/0252619 A1* | 11/2006 | Yamada | G03G 15/0233 492/56 |
| 2007/0269233 A1 | 11/2007 | Sakashita et al. | |
| 2008/0107780 A1 | 5/2008 | Kresevic et al. | |

FOREIGN PATENT DOCUMENTS

| | | | |
|---|---|---|---|
| JP | H11-106569 | 4/1999 | |
| JP | 2001-083668 | 3/2001 | |
| JP | 2001-209236 | 8/2001 | |
| JP | 2003-173041 | 6/2003 | |
| JP | 2006-099036 | 4/2006 | |
| JP | 2009-203408 | 9/2009 | |
| JP | 2011-053406 | 3/2011 | |
| WO | WO-9800762 A1 * | 1/1998 | G02B 5/1861 |

\* cited by examiner

CHARGING MEMBER, PROCESS CARTRIDGE, AND ELECTROPHOTOGRAPHIC IMAGE FORMING APPARATUS

This application is a division of application Ser. No. 14/257,990 filed Apr. 21, 2014, which in turn is a continuation of International Application No. PCT/JP2013/007550, filed Dec. 24, 2013, which claims the benefit of Japanese Patent Application No. 2012-285241, filed Dec. 27, 2012, of which content is incorporated into a part of this application by reference.

BACKGROUND OF THE INVENTION

Field of the Invention

The present invention relates to a charging member, a process cartridge, and an electrophotographic image forming apparatus.

Description of the Related Art

An electrophotographic image forming apparatus (hereinafter also referred to as electrophotographic apparatus) using an electrophotographic method mainly includes an electrophotographic photosensitive member (hereinafter also referred to as "photosensitive member"), a charging device, an exposure device, a developing device, a transferring device, and a fixing device. The charging device allows the surface of a photosensitive member to be charged to a predetermined potential through application of a voltage. A method for charging the surface of a photosensitive member by application of a voltage to a charging member arranged in contact with or adjacent to the surface of a photosensitive member is commonly used (herein after also referred to "contact charging method").

In a contact charging method, vibration of the photosensitive member in an electrophotographic apparatus may cause unstable contact between the charging member and the photosensitive member, resulting in uneven charging to the surface of a photosensitive member in some cases.

In particular with the improved process speed of the recent electrophotographic apparatus, vibration of the photosensitive member tends to increase. In order to solve the problem, Japanese Patent Application Laid-Open No. 2001-209236 discloses a charging member with enhanced vibration absorbability which has an elastic layer with a controlled hardness and a controlled specific gravity.

SUMMARY OF THE INVENTION

As a result of investigation by the present inventors, however, it was found that there is a room for improvement in the charging member in Japanese Patent Application Laid-Open No. 2001-209236 for eliminating charging unevenness of a photosensitive member caused by vibration of the photosensitive member.

The present invention is, therefore, directed to providing a charging member which hardly causes charging unevenness of a photosensitive member even when vibration of the photosensitive member occurs.

Further, the present invention is directed to providing a process cartridge and an electrophotographic apparatus, capable of stably forming a high-quality electrophotographic image.

According to one aspect of the present invention, there is provided a charging member having an electro-conductive support, an electro-conductive elastic layer, and a surface layer. The elastic layer contains a resin having an epichlorohydrin chain in the molecular structure and at least one compound selected from the group consisting of a compound represented by the following formula (1), a compound represented by the following formula (3), and a compound represented by the following formula (4).

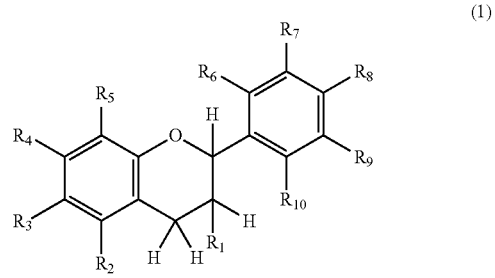

(1)

In the formula (1), $R_1$ represents a hydroxyl group or a substituent represented by the following formula (2), and $R_2$ to $R_{10}$ each independently represent a hydrogen atom or a hydroxyl group, wherein at least two of $R_1$ to $R_{10}$ are hydroxyl groups.

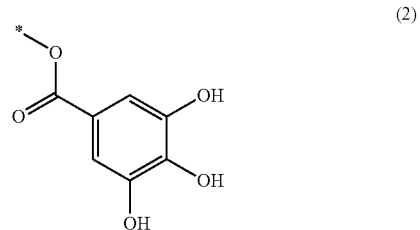 [SMILES: *OC(=O)c1cc(O)c(O)c(O)c1]

(2)

In the formula (2), * represents a bonding portion with the 3-position carbon atom of a compound represented by the formula (1).

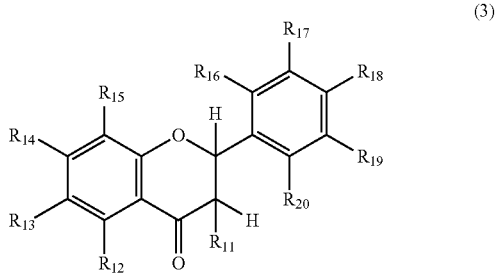

(3)

In the formula (3), $R_{11}$ to $R_{20}$ each independently represent an atom or a group selected from the group consisting of a hydrogen atom, a hydroxyl group, and a methoxy group, wherein at least two of $R_{11}$ to $R_{20}$ are hydroxyl groups.

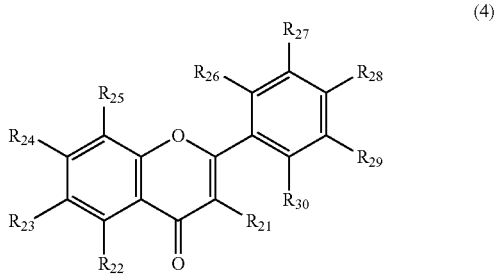

(4)

In the formula (4), $R_{21}$ to $R_{30}$ each independently represent an atom or a group selected from the group consisting of a hydrogen atom, a hydroxyl group, and a methoxy group, wherein at least two of $R_{21}$ to $R_{30}$ are hydroxyl groups.

According to another aspect of the present invention, there is provided an electrophotographic image forming apparatus having an electrophotographic photosensitive member and a charging member arranged to charge the electrophotographic photosensitive member, wherein the charging member is the above-described charging member.

According to further aspect of the present invention, there is provided a process cartridge which integrally supports the charging member and at least one selected from the group consisting of an electrophotographic photosensitive member, a developing unit, a transferring unit, and a cleaning unit, and is detachably mountable to an electrophotographic image forming apparatus.

The present invention provides a charging member which hardly causes charging unevenness of a photosensitive member even when vibration of the photosensitive member occurs.

The present invention also provides a process cartridge and an electrophotographic apparatus, capable of stably forming a high-quality electrophotographic image.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

«Banding Image»

To begin with, a banding image is described in the following. A banding image is a streak-like image unevenness existing on an outputted half tone image (image drawn with horizontal lines with a 1-dot width and 2-dot space in the direction vertical to the rotation direction of a photosensitive member). The streak-like image is an image having streaks vertical to the rotation direction of a photosensitive member (discharge direction of a medium of paper). As a banding image, a streak-like image corresponding to the cycle of a charging member may be typically identified. A charging member with the configuration of the present invention suppresses the occurrence of the banding image due to charging unevenness of a photosensitive member caused by vibration of a photosensitive member.

«Charging Member»

The shape of a charging member of the present invention is not specifically limited, including, for example, a roller shape, a flat-plate shape, or a belt shape. Although the description is focused on a charging roller in the following, the present invention is not limited thereto. Firstly, as an aspect of a charging member of the present invention, a specific configuration example of a charging roller is shown in FIG. 1A and FIG. 1B.

Figure 1A:
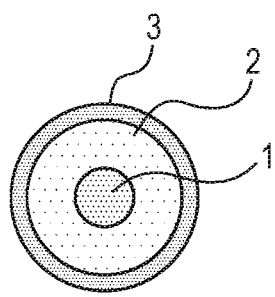
FIG. 1A is a diagram of a charging member according to an example of the present invention, illustrating a schematic cross-sectional view of a charging roller in the direction orthogonal to the axis of the charging roller.
Figure 1B:
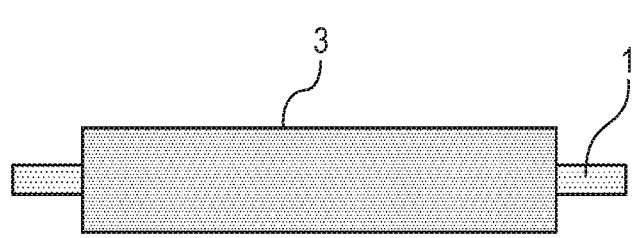
FIG. 1B is a diagram of a charging member according to an embodiment of the present invention, illustrating a schematic side view of a charging roller.

FIG. 1A is a schematic cross-sectional view in the direction orthogonal to the axis of a charging roller. FIG. 1B is a schematic side view of a charging roller. The charging roller shown in FIG. 1A and FIG. 1B includes an electro-conductive support 1, an electro-conductive elastic layer 2 formed on the support, and a surface layer 3 formed on the elastic layer. In the present invention, another layer (e.g. adhesion layer) may be arranged between the support and the elastic layer, or between the elastic layer and the surface layer.

<Electro-Conductive Support>

As an electro-conductive support (substrate), conductivity (volume resistivity: $1\times10^{-6}$ Ω·cm to $1\times10^{2}$ Ω·cm) and function for supporting an elastic layer, a surface layer and the like to be arranged thereon are required. Examples of the material include a metal such as iron, copper, stainless steel, aluminum, and nickel and an alloy thereof. Plating or the like may be applied to these surfaces so as to impart scratch resistance within a range not to impair the conductivity. An electro-conductive support having surface conductivity produced by coating the surface of a resin substrate with metals or the like, or an electro-conductive support produced from an electro-conductive resin composition can be also used as the electro-conductive support. The shape of the electro-conductive support can be selected according the shape of a charging member to be produced, examples of which include, for example, a hollow cylinder shape, a solid cylindrical shape and a belt shape.

<Elastic Layer>

The elastic layer 2 of the present invention has the same degree of conductivity which the elastic layer of a charging member typically has. More specifically, the layer has conductivity with a volume resistivity approximately ranging from $1\times10^{2}$ Ω·cm to $1\times10^{6}$ Ω·cm. The elastic layer 2 contains a resin having an epichlorohydrin chain in the molecular structure and a specific flavonoid compound having two or more hydroxyl groups in the molecular structure. The elastic layer may also contain a conducting agent for imparting conductivity and other additives.

Since the elastic layer contains a resin having an epichlorohydrin chain in the molecular structure and a specific flavonoid compound having two or more hydroxyl groups in the molecular structure, the loss tangent (tan δ) of the elastic layer may be increased. Even when the photosensitive member in contact the charging member having such an elastic layer vibrates, the vibration attenuates in the elastic layer of the charging member. Consequently, the contact state between the photosensitive member and the charging member may be stabilized and the occurrence of a banding image caused by vibration of the photosensitive member may be suppressed.

The present inventors suppose the mechanism by which the tan δ of the elastic layer in the configuration increases as follows.

Figure 2:
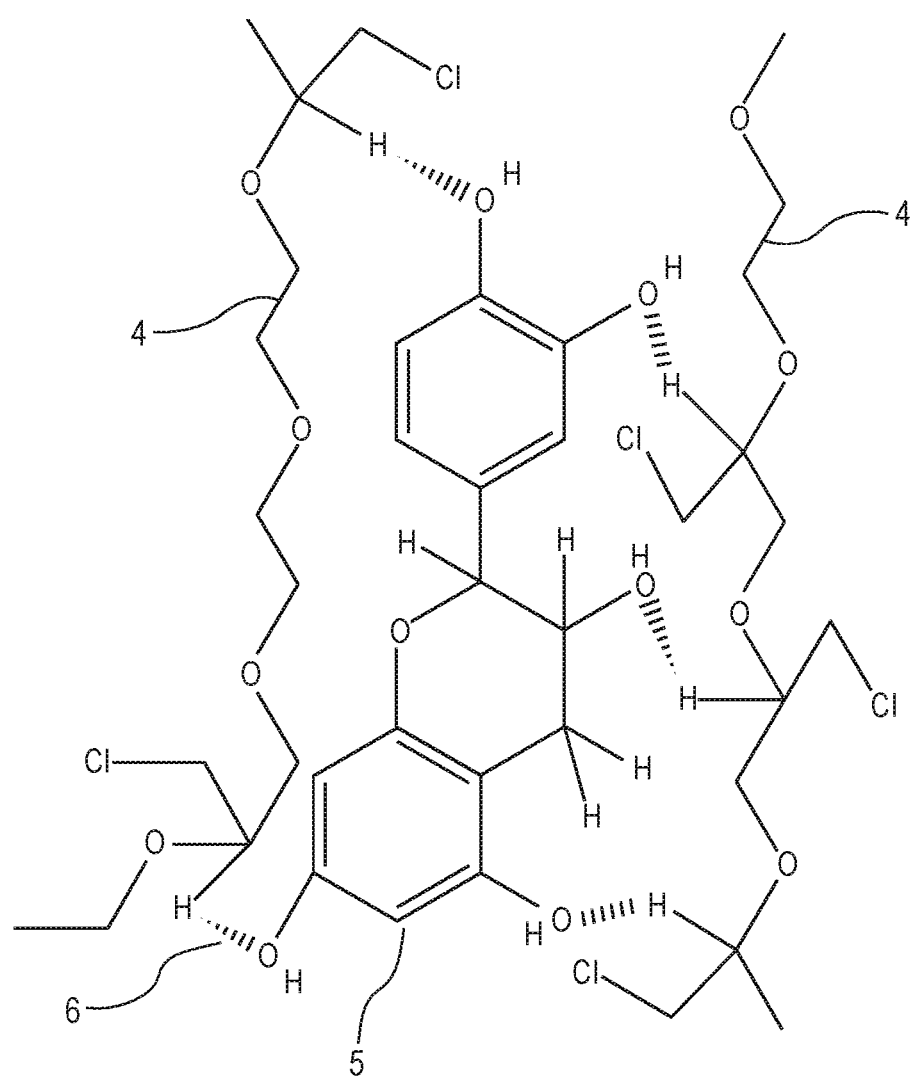
FIG. 2 is a diagram illustrating a mechanism by which the tan δ of the elastic layer of a charging member of the present invention increases.

As shown in FIG. 2, the epichlorohydrin chain of a resin 4 having the epichlorohydrin chain in the molecular structure forms a hydrogen bond 6 with a hydroxyl group of a specific flavonoid compound 5 having two or more hydroxyl groups in the molecular structure (a flavan compound described in FIG. 2). The α hydrogen of the epichlorohydrin chain has acid properties under the influence of a Cl group which is an electron withdrawing group. The specific flavonoid compound having two or more hydroxyl groups in the molecule has a high dissociation degree of the proton of a hydroxyl group due to the appropriate positions of a benzopyran ring and a benzene ring. Consequently, the hydrogen bond shown in FIG. 2 may be formed. It is believed that the hydrogen bonds thus formed among the molecules convert the vibration energy to the thermal energy, resulting in the increase of the tan δ.

In the present invention, the resin having an epichlorohydrin chain in the molecular structure and the specific flavonoid compound which are in a hydrogen-bonded state may be contained in an elastic layer.

(Flavonoid Compound)

The flavonoid compound contained in an elastic layer is at least one compound selected from the group consisting of a compound represented by the formula (1) (hereinafter also referred to as "flavan compound"), a compound represented by the formula (3) (hereinafter also referred to as "flavanone compound"), and a compound represented by the formula (4) (hereinafter also referred to as "flavone compound").

The total content of these flavonoid compound contained in an elastic layer is preferably 2.0 mass % or more from the view point of the tan δ, and preferably 20 mass % or less from the view point of C-set. On this occasion, preferably a total content of 5.0 parts by mass or more and 30 parts by mass or less of the flavonoid compounds relative to 100 parts by mass of a resin having an epichlorohydrin chain in the molecular structure to be described are blended. The C-set means the so-called permanent compression strain (compression set), which is a deformation to be hardly restored at the part in contact with the photosensitive member of a charging roller.

In the case of combination use of a flavan compound, a flavanone compound, and a flavone compound, the blending ratios may be appropriately set without specific limitations.

Flavan Compound

The flavan compound (also including a flavanol compound) for use in the present invention is a compound represented by the formula (1).

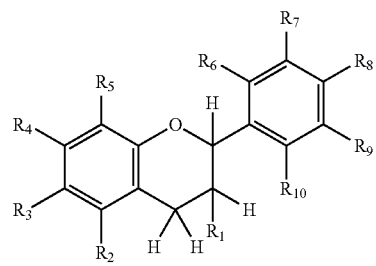

In the formula (1), $R_1$ represents a hydroxyl group or a substituent represented by the following formula (2), and $R_2$ to $R_{10}$ each independently represent a hydrogen atom or a hydroxyl group, wherein at least two of $R_1$ to $R_{10}$ are hydroxyl groups. As described above, so long as the flavan compound has two or more hydroxyl groups, all of the $R_1$ to $R_{10}$ may be hydroxyl groups.

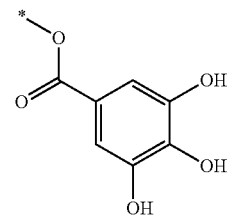

In the formula (2), * represents the bonding portion with the 3-position carbon atom of a compound represented by the formula (1).

Examples of the flavan compound having two or more hydroxyl groups in the molecular structure include epicatechin, epigallocatechin, epicatechin gallate, epigallocatechin gallate, 6,4'-dihydroxyflavan, and 3,6,4'-trihydroxyflavan.

Among them, at least one of epicatechin, epigallocatechin, epicatechin gallate, and epigallocatechin gallate can be used as the flavan compound from the view point of the dispersibility in an elastic layer.

Flavanone Compound

The flavanone compound (also including a flavanonol compound) for use in the present invention is a compound represented by the formula (3).

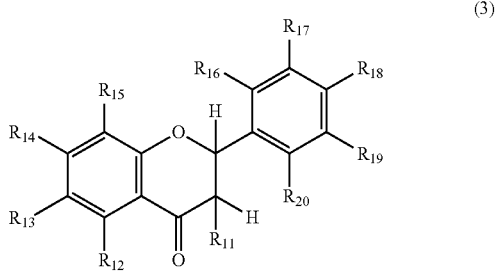

In the formula (3), $R_{11}$ to $R_{20}$ each independently represent an atom or a group selected from the group consisting of a hydrogen atom, a hydroxyl group, and a methoxy group, wherein at least two of $R_{11}$ to $R_{20}$ are hydroxyl groups. As described above, so long as the flavanone compound has two or more hydroxyl groups, all of the $R_{11}$ to $R_{20}$ may be hydroxyl groups.

Examples of the flavanone compound having two or more hydroxyl groups in the molecular structure include naringenin, hesperetin, alpinon, eriodictyol, sakuranetin, citronetin, taxifolin, and liquiritigenin.

Among them, at least one of naringenin and hesperetin can be used as the flavanone compound, from the view point of the dispersibility in an elastic layer.

Flavone Compound

The flavone compound (also including a flavonol compound) for use in the present invention is a compound represented by the formula (4).

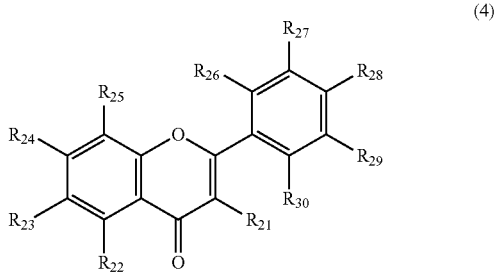

(4)

In the formula (4), $R_{21}$ to $R_{30}$ each independently represent an atom or a group selected from the group consisting of a hydrogen atom, a hydroxyl group, and a methoxy group, wherein at least two of $R_{21}$ to $R_{30}$ are hydroxyl groups. As described above, so long as the flavone compound has two or more hydroxyl groups, all of the $R_{21}$ to $R_{30}$ may be hydroxyl groups.

Examples of the flavone compound having two or more hydroxyl groups in the molecular structure include 3,5,6,7,3',4'-hexahydroxyflavone, 3,5,7,3',4',5'-hexahydroxyflavone 5,7,4'-trihydroxyflavone, 3,7,3',4'-tetrahydroxyflavone, 5,7,3',4'-tetrahydroxyflavone, 3,5,7,4'-tetrahydroxyflavone, 3,5,7,3',4'-pentahydroxyflavone, 3,5,7,2',4'-pentahydroxyflavone, 7,8-dihydroxyflavone, 5,7-dihydroxyflavone, 5,7-dihydroxy-4'-methoxyflavone, 4'-methoxy-3,5,7-trihydroxyflavone, and 3-methoxy-5,7,3',4'-tetrahydroxyflavone.

Among them, at least one of 3,5,6,7,3',4'-hexahydroxyflavone and 3,5,7,3',4',5'-hexahydroxyflavone can be used as the flavone compound, from the view point of the dispersibility in an elastic layer.

(Resin Having an Epichlorohydrin Chain in the Molecular Structure)

The resin (rubber) having an epichlorohydrin chain in the molecular structure for use in the present invention is a resin having a unit (epichlorohydrin unit) by ring-opening polymerization of epichlorohydrin in the molecular structure. The resin may include other monomer units such as an alkylene oxide unit and an allyl glycidyl ether unit besides the epichlorohydrin unit in the molecular unit.

Examples of the resin (epichlorohydrin rubber) include an epichlorohydrin homopolymer, an epichlorohydrin-alkylene oxide copolymer, an epichlorohydrin-allyl glycidyl ether copolymer, and an epichlorohydrin-alkylene oxide-allyl glycidyl ether ternary copolymer. In particular, an epichlorohydrin-alkylene oxide-allyl glycidyl ether ternary copolymer may be suitably used as the resin among them, having stable conductivity in the medium resistance range. The degree of polymerization and the composition ratio of the epichlorohydrin-alkylene oxide-allyl glycidyl ether ternary copolymer are arbitrarily adjusted, so that the conductivity and the workability may be controlled.

The content of the epichlorohydrin chain in the resin is preferably 10 mol % or more and 60 mol % or less relative to 100 mol % of the resin. In the case of the resin having an allyl glycidyl ether chain in the molecular structure, the content of the allyl glycidyl ether chain in the resin is preferably 1 mol % or more and 15 mol % or less relative to 100 mol % of the resin.

Examples of the alkylene oxide chain include an ethylene oxide chain and a propylene oxide chain. Among them, an ethylene oxide chain can be used for achieving high conductivity. The content of the ethylene oxide chain in the resin can be 40 mol % or more and 80 mol % or less.

The content of the resin having an epichlorohydrin chain in the molecular structure in an elastic layer can be 30 mass % or more from the view point of the tan δ and 90 mass % or less from the view point of the electric resistance value (due to the tendency to cause high resistance with a high content).

The elastic layer for use in the present invention may contain other common rubber (resin) on an as needed basis besides the resin having an epichlorohydrin chain in the molecular structure. Examples of the other common rubber include acrylonitrile butadiene rubber, acrylic rubber, urethane rubber, ethylene-propylene rubber, styrene-butadiene rubber, silicone rubber, and acrylic rubber. The content of the common rubber can be 40 parts by mass or less relative to 100 parts by mass of the resin having an epichlorohydrin chain in the molecular structure in the case of containing the common rubber.

(Conducting Agent)

The general classification of conductive agents includes an electron conductive agent and an ionic conductive agent, either of which may be used in the present invention.

Examples of the electron conductive agent include carbon black, graphite, and a metal oxide (e.g. conductive zinc oxide and conductive tin oxide). These conductive agents may be used singly or in combinations of two or more. The amount of the electron conductive agent contained in an elastic layer can be 5.0 parts by mass or more and 60 parts by mass or less relative to 100 parts by mass of the resin having an epichlorohydrin chain in the molecular structure.

Examples of the ionic conductive agent include an inorganic ionic material such as lithium perchlorate, a cationic surfactant such as a modified aliphatic dimethyl ethyl ammonium ethosulfate, a zwitterionic surfactant such as dimethyl alkyl lauryl betaine, a quaternary ammonium salt such as trimethyl octadecyl ammonium perchlorate, and an organic lithium salt such as lithium trifluoromethanesulfonate. These conductive agents may be used singly or in combinations of two or more. Among the ionic conductive agents, a perchloric acid quaternary ammonium salt in particular is suitably used, having stable resistance to changes in environment. The amount of the ionic conductive agent contained in an elastic layer is preferably 0.01 parts by mass or more and 5 parts by mass or less, more preferably 0.1 parts by mass or more and 2 parts by mass or less, relative to 100 parts by mass of the resin having an epichlorohydrin chain in the molecular structure.

(Other Additives)

Furthermore, the elastic layer may appropriately include other additives such as a plasticizer, an extender, a vulcanizing agent, a vulcanizing accelerator, an antiaging agent, and a foaming agent.

<Surface Layer>

The surface layer for use in the present invention has conductivity with a volume resistivity of $1 \times 10^4$ Ω·cm to $1 \times 10^{10}$ Ω·cm, and may contain a binder and fine particles.

As the binder for use in the surface layer, a resin can be used from the view point of high release properties without causing contamination of a photosensitive member or other members.

As the binder resin, a known binder resin in the field of electrophotographic apparatus such as a thermosetting resin and a thermoplastic resin may be used. Among them, a fluororesin, a polyamide resin, an acrylic resin, a polyurethane resin, an acrylic urethane resin, a silicone resin, a butyral resin and the like are more preferred. These binder resins may be used singly, or two or more kinds of these may be used in combination. Alternatively, the raw material monomers of these resins may be copolymerized to be used as a copolymer.

Three types of fine particles can be used, including conductive fine particles, metal oxide fine particles, and resin fine particles.

The electro-conductive fine particles are used for the purpose of adjusting the electric resistance of the surface layer. Examples of the electro-conductive fine particles include carbon black, graphite, and carbon black-silica composite particles. Among them, carbon black-silica composite particles can be used from the view point of dispersibility. The volume average particle diameter of conductive fine particles can be 10 nm or more from the view point of dispersibility and 500 nm or less from the view point of conductivity to be achieved.

The metal oxide particles are used for the purposes of adjusting the electric resistance of the surface layer and enhancing dispersibility of the electro-conductive particles. Examples of the metal oxide particles include titanium oxide, zinc oxide, tin oxide, and indium oxide. Among them, titanium oxide can be used in the view point of dispersibility enhancement. The volume average particle diameter of metal oxide fine particles can be 10 nm or more and 500 nm or less from the view point of dispersibility enhancement.

The resin fine particles are used for the purpose of controlling the surface roughness of a charging member. Examples of the resin fine particles include acrylic resin fine particles, polymethylmethacrylate resin fine particles, phenol resin fine particles, silicone resin fine particles, ABS resin fine particles, melamine resin fine particles, and styrene resin fine particles. Among them, polymethylmethacrylate resin fine particles can be used in the view point of dispersibility in the surface layer. The volume average particle diameter of the resin fine particles can be 5 µm or more and 50 µm or less in the view point of surface roughness formation.

<Volume Average Particle Diameter of Fine Particles>

The volume average particle diameter of fine particles may be measured with a laser diffraction particle size distribution analyzer (trade name: "COULTER LS-230 PARTICLE SIZE ANALYZER" made by Beckman Coulter, Inc.). In the measurement, a small amount of module is used with a measurement solvent of isopropyl alcohol (IPA). Firstly, the inner part of the measurement system of a measurement apparatus is cleaned with IPA for about 5 minutes, and a background function is performed after the cleaning. Approximately 10 mg of fine particles are then added to 50 ml of IPA. A solution having a suspended sample is subject to a dispersion treatment for about 2 minutes with an ultrasonic disperser so as to produce a sample liquid. The sample liquid is gradually added to the measurement system of the measurement apparatus, such that the PIDS on the apparatus screen becomes 45% or more and 55% or less through adjustment of the sample concentration in the measurement system. Subsequently, the measurement is performed to obtain the volume average particle diameter based on the calculation from the volume distribution.

<Volume Resistivity of Fine Particles>

The volume resistivity of fine particles is measured under an environment at 23° C., 55% RH (relative humidity), and normal pressure ($10^5$ Pa), using an apparatus having cylindrical electrodes made of stainless steel (SUS 316) arranged above and below a hollow cylinder made of polytetrafluoroethylene (PTFE) having an inner diameter 1 cm.

More specifically, a measurement sample (fine particles) and electrodes are firstly left standing under the environment for 12 hours or more so as to have affinity with the environment. Subsequently, the lower electrode made of SUS is arranged below the PTFE cylinder, and approximately 2 g of fine particles are evenly set in. The cylindrical electrode made of SUS is then placed from above, so that the fine particles are held with the PTFE cylinder and the upper and lower electrodes. The apparatus is left standing in a state under a pressure of 10 MPa for 1 minute or more. Subsequently, a voltage of 200 V is applied to the electrodes, with a minute electric current meter (trade name: ADVANTEST R8340A ULTRA HIGH RESISTANCE METER, made by Advantest Corporation). The electric current is measured after 30 seconds so as to obtain the volume resistivity based on the calculation from the space between the electrodes and the electrode area.

«Manufacturing Method of Charging Member»

The charging member of the present invention may be manufactured by a manufacturing method including the following steps:

(a) a step of forming an electro-conductive elastic layer on an electro-conductive support by applying a raw material rubber composition (material for forming an elastic layer) containing a resin having an epichlorohydrin chain in the molecular structure and a specific flavonoid compound having two or more hydroxyl groups in the molecular structure thereto; and (b) a step of forming a surface layer on the elastic layer.

Alternatively the manufacturing method may include the following step between the steps (a) and (b):

(c) a step of grinding the surface of the elastic layer.

Each step is described in detail in the following.

<Elastic Layer Forming Step: Step a>

Firstly, a resin having an epichlorohydrin chain in the molecular structure, a specific flavonoid compound having two or more hydroxyl groups in the molecular structure, and other various additives as needed are, for example, kneaded with a kneader so as to produce a raw material rubber composition for forming an elastic layer. Examples of the kneader include a ribbon blender, a Nauta mixer, a Henschel mixer, a super mixer, a Bambury mixer, and a pressure kneader.

Subsequently, the raw material rubber composition is applied onto the electro-conductive support so as to form an electro-conductive elastic layer. More specifically, the following method may be employed. For example, using an extrusion forming device having a cross head, a raw material rubber composition is coaxially applied in a cylindrical shape onto an electro-conductive support as central shaft coated with an adhesive, and the electro-conductive support and the material for an elastic layer are integrally extruded to form an elastic roller. The cross head is a device commonly used for covering electrical cables and wires, being attached for use to a rubber discharge part of the cylinder of an extruder.

In an alternative method, a rubber tube made of the raw material rubber composition is formed, to which an electro-conductive support coated with an adhesive is inserted in the tube to be bonded. In another alternative method, an electro-conductive support coated with an adhesive is covered with an unvulcanized rubber sheet made of the raw material rubber composition so as to be vulcanized in a mold. As described above, the heating operation (vulcanizing operation) may be performed during formation of an elastic layer, according to the material for use in the raw material rubber composition.

The thickness of the elastic layer can be 0.3 mm or more and 9.0 mm or less in the view point of the contact stability with a photosensitive member.

<Grinding Step: Step c>

Subsequently, the surface of the produced elastic layer may be polished on an as needed basis. As a grinding device, a cylindrical grinding machine for forming a predetermined outer diameter may be used. Examples of the cylindrical grinding machine include a traverse-type NC cylindrical grinding machine and a plunge-cut type NC cylindrical grinding machine. A plunge-cut type NC cylindrical grinding machine is preferred, capable of reducing the processing time through use of a wider grinding stone compared to a traverse-type machine, with a smaller change in diameter of the grinding stone.

<Surface Layer Forming Step: Step b>

Subsequently, for example, a coating liquid of a raw material (material for forming a surface layer) is applied onto the produced elastic layer so as to form a surface layer. Examples of the coating method include a vertical ring coating method, a dip coating method, an immersion coating method, a spray coating method, a roll coating method, a curtain coating method, and a gravure printing method. Among them, a vertical ring coating method and a dip coating method are most commonly used.

The thickness of the surface layer is preferably 0.1 μm or more and 100 μm or less, more preferably 1 μm or more and 30 μm or less.

«Physical Properties of Charging Member and Measurement Methods Thereof»

The electric resistance, surface roughness, hardness and tan δ of the charging member of the present invention are not particularly limited, but can be within the ranges specified below.

Figure 3:
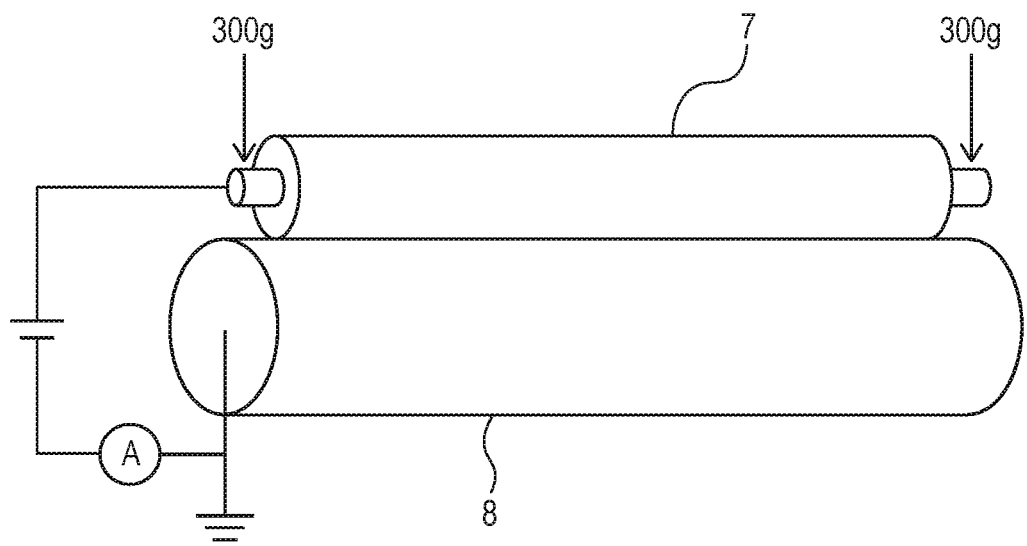
FIG. 3 is a diagram illustrating a measurement method of the electric resistance of a charging member of the present invention.

The electric resistance of a charging member (more specifically, the electric resistance of the part composed of an elastic layer and a surface layer) can be $1.0 \times 10^4 \Omega$ or more and $9.9 \times 10^7 \Omega$ or less. The electric resistance of the charging member may be measured with a measurement device as shown in FIG. 3. More specifically the measurement is performed by applying a load of 300 g to each of both ends of the electro-conductive support such that an aluminum drum 8 comes in contact with the charging member (a charging roller 7), and applying a voltage of 200 V thereto.

The surface roughness of the charging member is represented by Rz measured by a contact surface roughness meter. The Rz can be 0.1 μm or more and 50 μm or less.

The hardness of the charging member (more specifically, the hardness of the part composed of an elastic layer and a surface layer) measured with an Asker C hardness meter can be 20 or more and 80 or less.

Figure 6:
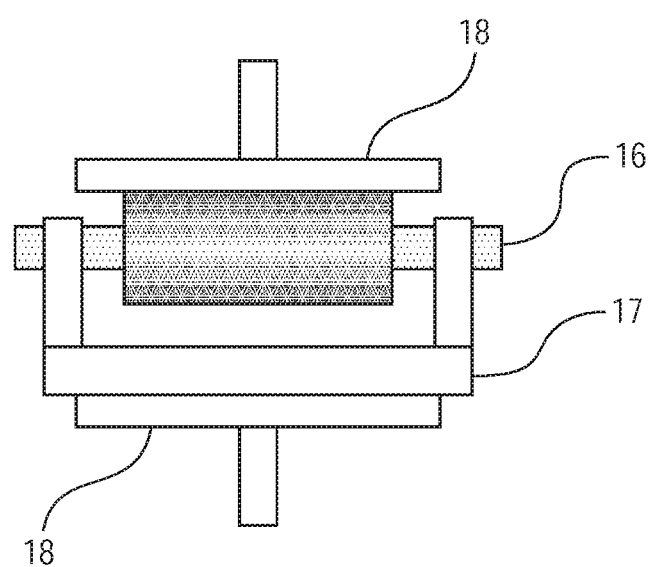
FIG. 6 is a diagram illustrating a measurement method of the tan δ of the elastic layer of a charging member.

The tan δ of the charging member (more specifically, the tan δ of an elastic layer including the surface layer part) may be obtained by measuring a partially cutout sample taken from the charging member with a viscoelasticity measurement device (e.g. a viscoelasticity spectrometer, trade name: EXSTAR 6000DMS, made by Eko instruments). More specifically, a charging roller is partially cut out to form a mini roller 16 as shown in FIG. 6. Subsequently, a shaft bearing 17 is prepared, on which the mini roller 16 is placed. Subsequently, a sensor 18 of the viscoelasticity measurement device comes in contact with the rubber face (surface) of the mini roller 16, for the measurement of the storage elastic modulus E' and the loss elastic modulus E" of the charging roller in a compression mode, so that the tan δ can be calculated.

The tan δ of the charging member can be 0.10 or more and 0.40 or less. With a tan δ of 0.10 or more, the banding image may be easily inhibited. With a tan δ of 0.40 or less, the occurrence of a banding image may be suppressed, the C-set image is inhibited, and furthermore a stable charging state may be easily achieved.

<Electrophotographic Apparatus>

Figure 4:
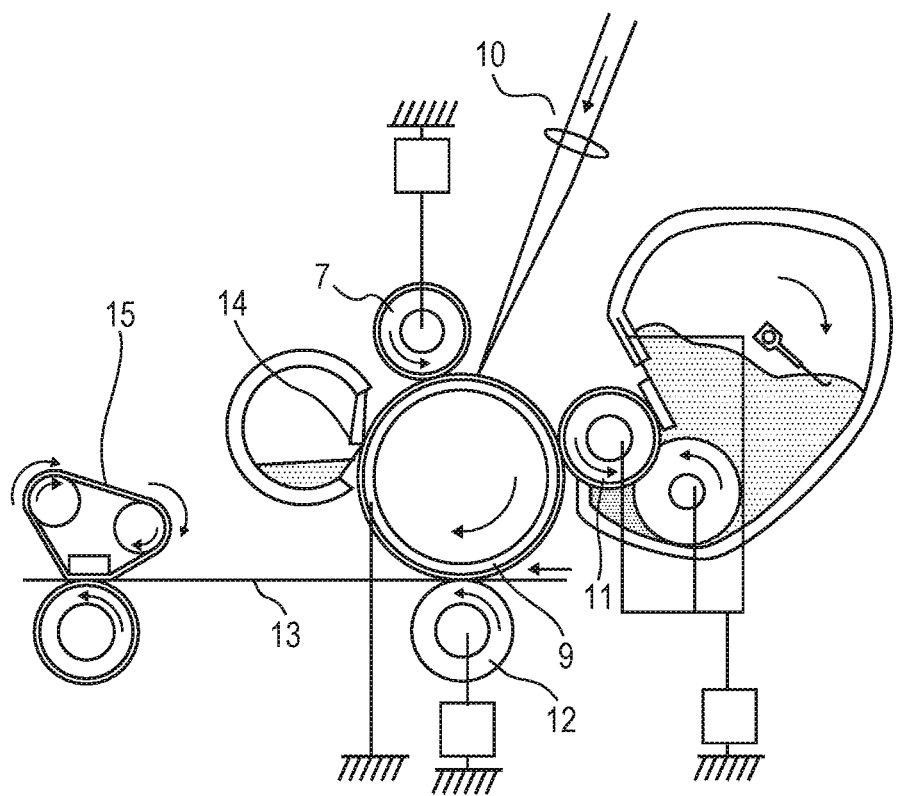
FIG. 4 is a schematic constitution diagram of an electrophotographic apparatus according to an embodiment of the present invention.

The electrophotographic image forming apparatus (electrophotographic apparatus) may include an electrophotographic photosensitive member, a charging device which charges the electrophotographic photosensitive member, a latent image forming device which performs exposure, a developing device for developing a toner image, a transferring device for transferring to a transfer material, a cleaning device for collecting transfer toner on a photosensitive member, and a fixing device for fixing a toner image. A schematic diagram of the electrophotographic apparatus in an embodiment is shown in FIG. 4.

In the electrophotographic apparatus, a photosensitive member 9 is a rotary drum type, having a photosensitive layer on an electro-conductive substrate. The photosensitive member 9 is rotary-driven in the arrow direction at a predetermined circumferential velocity (process speed).

The charging device includes a contact type charging roller 7 to be arranged in contact with the photosensitive member 9 with a predetermined pressing force. The charging roller 7 is rotary-driven, following the rotation of the photosensitive member 9. The photosensitive member 9 is chargeable to a predetermined potential by applying a predetermined DC voltage to the charging roller 7 from a power supply for charging. A charging member of the present invention may be used as the charging roller.

As the latent image forming device 10 for forming an electrostatic latent image on the photosensitive member 9, for example, an exposure device such as a laser beam scanner is used. The evenly charged photosensitive member 9 is subject to exposure corresponding to the image information so as to form the electrostatic latent image.

The developing device includes a developing roller 11 arranged adjacent to or in contact with the photosensitive member. The toner electrostatically treated in the same polarity as the charged polarity of the photosensitive member 9 develops a visible toner image from the electrostatic latent image through reversal development.

The transferring device includes a contact-type transferring roller 12. The toner image is transferred from the photosensitive member 9 to a transfer material 13 such as plain paper. The transfer material 13 is conveyed by a paper supply system (not shown in drawing) having a conveying member.

The cleaning device including a blade-type cleaning member 14 and a collection container mechanically scrapes off the toner remaining after transferring on the photosensitive member for collection after transferring. In the case of using a simultaneous development and cleaning method in which the toner remaining after transferring is collected by a developing device, the cleaning device may be omitted.

The fixing device 15 including a heated roll and the like fixes a transferred toner image on the transfer material 13, which is discharged outside the machine.

The electrophotographic apparatus of the present invention may also include, for example, the following electrophotographic process cartridge, an exposure device, and a developing device.

<Electrophotographic Process Cartridge>

Figure 5:
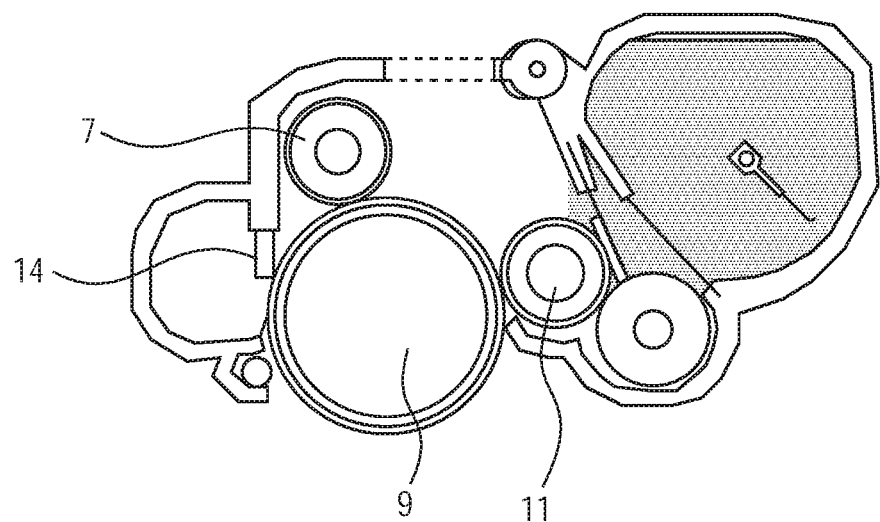
FIG. 5 is a schematic constitution diagram of a process cartridge according to an embodiment of the present invention.

The electrophotographic apparatus of the present invention may also use an electrophotographic process cartridge of the present invention which integrates (integrally supports) the charging member and at least one selected from the group consisting of a photosensitive member, a developing device (developing unit), a transferring device (transferring unit), and a cleaning device (cleaning unit), being designed to be detachably mountable to the electrophotographic apparatus. The process cartridge in an embodiment is shown in FIG. 5. In the process cartridge, the charging member (charging roller 7) is at least integrated with a member to be charged (photosensitive member 9) and detachably mountable to a main body of the electrophotographic apparatus. As the charging member, the charging member of the present invention is used.

EXAMPLES

The following specific examples further illustrate the present invention in details, but the scope of the present invention is not limited thereto.

Manufacturing Example A: Manufacturing of Fine Particles 1 (Conductive Fine Particles)

To 7.0 kg of silica particles (volume average particle diameter: 12.5 nm; volume resistivity: $1.8 \times 10^{12}$ Ω·cm), 140 g of methyl hydrogen polysiloxane was added with an edge runner operating, so that mixing/stirring was performed for 30 minutes with a line load of 588 N/cm (60 kg/cm). On this occasion, the stirring rate was 22 rpm. Carbon black particles (volume average particle diameter: 28 nm; volume resistivity: $1.2 \times 10^2$ Ω·cm) with an amount of 7.0 kg was added thereto for a time period of 10 minutes with an edge runner operating, and mixing/stirring was further performed for 60 minutes with a line load of 588 N/cm (60 kg/cm). As described above, the carbon black was attached to the surface of silica particles coated with methyl hydrogen polysiloxane, which was then dried at 80° C. for 60 minutes with a drying machine. Consequently, fine particles 1 were manufactured.

On this occasion, the stirring rate was 22 rpm. The produced fine particles 1 had a volume average particle diameter of 15 nm and a volume resistivity of $2.3 \times 10^2$ Ω·cm.

Manufacturing Example B: Manufacturing of Fine Particles 2 (Metal Oxide Fine Particles)

Needle-shaped rutile type titanium oxide particles (volume average particle diameter: 15 nm; aspect ratio (vertical:horizontal)=3:1; volume resistivity: $2.3 \times 10^{10}$ Ω·cm) in an amount of 1,000 g was blended with 110 g of isobutyl trimethoxysilane as finishing agent and 3,000 g of toluene as solvent so as to prepare a slurry. The slurry was agitated with a stirrer for 30 minutes and then supplied to a visco mill filled with glass beads (trade name: "GB200M", made by Potters-Ballotini Co., Ltd.) up to 80% of the effective capacity for wet crushing at a temperature of 35±5° C. Toluene was removed from the slurry produced by the wet crushing by distillation under reduced pressure (bath temperature: 110° C.; product temperature: 30 to 60° C.; pressure reduction degree: approximately 100 Torr (approximately 13.3 kPa)) with a kneader, and the finishing agent was baked at 120° C. for 2 hours. The baked particles were cooled down to room temperature (25° C.), and then crushed into fine particles 2 with a pin mill. The produced fine particles 2 had a volume average particle diameter of 16 nm and a volume resistivity of $5.6 \times 10^{10}$ Ω·cm.

Example 1

Manufacturing of Charging Roller 1

To a stainless steel rod having a diameter of 6 mm and a length of 252 mm was coated with a thermosetting adhesive (trade name: METALOC U-20, made by Toyokagaku Kenkyusho Co., Ltd.), which was then left standing in a hot-air oven at 200° C. for 30 minutes. An electro-conductive support was thus obtained.

In manufacturing a compound for the elastic layer, the materials shown in the following Table 1 were kneaded for 15 minutes with a closed type mixer which is adjusted at 50° C. for preparation of a rubber compound A.

TABLE 1

| Material for rubber compound A | Parts by mass |
|---|---|
| Epichlorohydrin-ethylene oxide-allyl glycidyl ether copolymer (EP:EO:AGE = 37:55:7.5) | 100 |
| Tetrabutyl ammonium perchlorate | 3 |
| Epicatechin (compound represented by formula (5)) | 15 |
| Zinc stearate (trade name: SZ-2000, made by Sakai Chemical Industry Co., Ltd.) | 1 |
| Zinc oxide (trade name: FLOWERS OF ZINC, 2 grade, made by Sakai Chemical Industry Co., Ltd.) | 5 |
| Calcium carbonate (trade name: NANOX #30, made by Maruo Calcium Co., Ltd.) | 50 |
| Polyadipate (trade name: POLYCIZER P-202, made by DIC Corporation) | 10 |

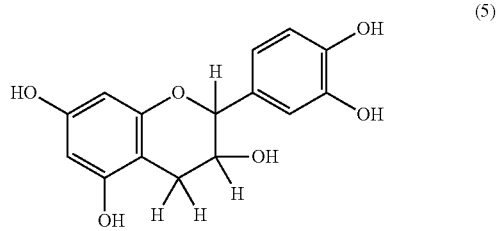 [SMILES: Oc1cc(O)c2c(c1)OC(c1ccc(O)c(O)c1)C(O)C2]

(5)

Subsequently, the rubber compound A and the materials shown in the following Table 2 were kneaded for 15 minutes with a two-roll mill cooled at 20° C. so as to prepare a rubber compound B. The parts by mass shown in Table 2 is relative to 100 parts by mass of epichlorohydrin-ethylene oxide-allyl glycidyl ether copolymer (EP:EO:AGE=37:55:7.5) in the rubber compound A.

TABLE 2

| Material for rubber compound B | Parts by mass |
| --- | --- |
| Sulfur | 1 |
| Di-2-benzothiazolyl disulfide (MBTS) | 2 |
| Tetramethylthiuram monosulfide (TMTM) | 0.5 |

Subsequently, the electro-conductive support as central shaft was coated with the rubber compound B in a cylindrical form with a cross head extruder and heated for vulcanization in a hot-air oven at 160° C. Consequently, an elastic roller precursor having an outer diameter of 9 mm was obtained (Step a). On this occasion, the temperature of the cross head extruder was set to 80° C. The ends of the elastic layer of the produced elastic roller precursor were cut off and ground with a plunge-cut type cylindrical grinding machine. Consequently, an elastic roller was obtained (Step c). The outer diameter ϕ of the elastic roller was set to 8.50 mm at the center of the roller, and 8.35 mm at the position 90 mm away from the center toward the end.

Subsequently, methyl isobutyl ketone was added to caprolactone modified acrylic polyol solution (trade name: "Placcel DC2016", made by Dicel Corporation), so as to prepare 10 mass % of solid content. To 1,000 parts by mass of the solution (100 parts by mass of acrylic polyol solid content), the materials shown in the following Table 3 were added to prepare a mixed solution.

TABLE 3

| Material | Parts by mass |
| --- | --- |
| Fine particles 1 (conductive fine particles) (manufactured in Manufacturing Example A) | 45 |
| Fine particles 2 (metal oxide fine particles) (manufactured in Manufacturing Example B) | 20 |
| Fine particles 3 (resin fine particles) (trade name: "MBX-8", made by Sekisui Chemical Co., Ltd.) | 5 |
| Modified dimethyl silicone oil (*1) | 0.08 |
| Blocked isocyanate mixture (*2) | 80.14 |

(*1) trade name: "SH28PA", made by Dow Corning Toray Co., Ltd.
(*2) a 7:3 mixture of the respective butanone oxime block products of hexamethylene diisocyanate (HDI) and isophorone diisocyanate (IPDI). The blocked isocyanate mixture had an isocyanate amount of "NCO/OH = 1.0".

Subsequently, 200 g of the mixed solution and 200 g of glass beads as a medium ("GB200M", made by Potters-Ballotini Co., Ltd.) were placed in a glass bottle having a capacity of 450 mL, so as to be dispersed for 24 hours with a paint shaker. The glass beads were then removed to produce an electro-conductive resin coating liquid.

Using the electro-conductive resin coating liquid, the produced elastic roller was coated by one-time dipping. The coated roller was air-dried at room temperature (25° C.) for 30 minutes, and further dried at 80° C. for 1 hour and 160° C. for 1 hour with a hot-air circulation dryer so as to produce a charging roller 1.

On this occasion, the dip coating was performed under the following conditions. The dipping time was 9 seconds. The pulling-up rate of the dip coat was changed linearly with time from an initial rate of 20 mm/s to an final rate of 2 mm/s.

Example 2

Manufacturing of Charging Roller 2

Except that 15 parts by mass of epicatechin for use in manufacturing the rubber compound A was changed to 10 parts by mass of epigallocatechin (a compound represented by formula (6)), a charging roller 2 was obtained by the same method as in Example 1.

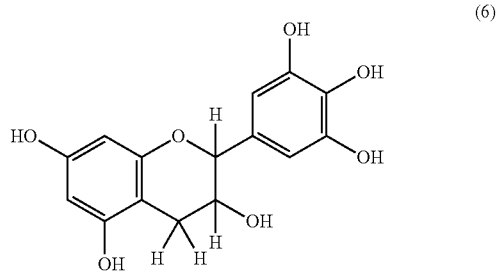 [SMILES: Oc1cc(O)c2c(c1)OC(c1cc(O)c(O)c(O)c1)C(O)C2]

(6)

Example 3

Manufacturing of Charging Roller 3

Except that 15 parts by mass of epicatechin for use in manufacturing the rubber compound A was changed to 12 parts by mass of epicatechin gallate (a compound represented by formula (7)), a charging roller 3 was obtained by the same method as in Example 1.

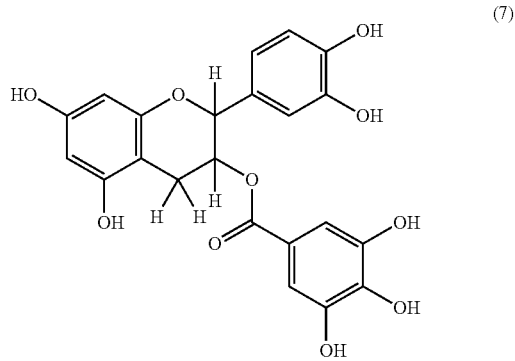 [SMILES: O=C(OC1Cc2c(O)cc(O)cc2OC1c1ccc(O)c(O)c1)c1cc(O)c(O)c(O)c1]

(7)

Example 4

Manufacturing of Charging Roller 4

Except that 15 parts by mass of epicatechin for use in manufacturing the rubber compound A was changed to 15 parts by mass of epigallocatechin gallate (a compound represented by formula (8)), a charging roller 4 was obtained by the same method as in Example 1.

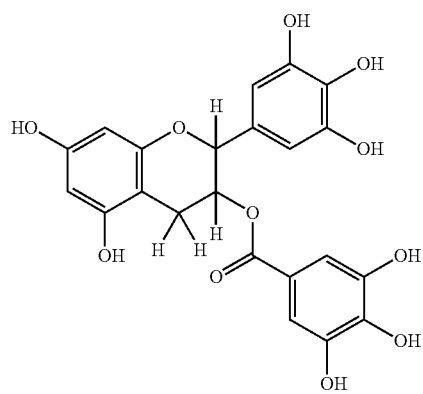

(8)

Example 5

Manufacturing of Charging Roller 5

Except that 15 parts by mass of epicatechin for use in manufacturing the rubber compound A was changed to 9 parts by mass of naringenin (a compound represented by formula (11)), a charging roller 5 was obtained by the same method as in Example 1.

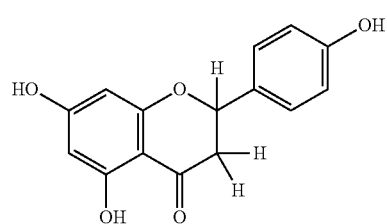

(11)

Example 6

Manufacturing of Charging Roller 6

Except that 15 parts by mass of epicatechin for use in manufacturing the rubber compound A was changed to 14 parts by mass of hesperetin (a compound represented by formula (12)), a charging roller 6 was obtained by the same method as in Example 1.

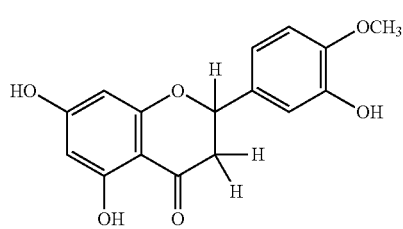

(12)

Example 7

Manufacturing of Charging Roller 7

Except that 15 parts by mass of epicatechin for use in manufacturing the rubber compound A was changed to 8 parts by mass of 3,5,6,7,3',4'-hexahydroxyflavone (a compound represented by formula (9)), a charging roller 7 was obtained by the same method as in Example 1.

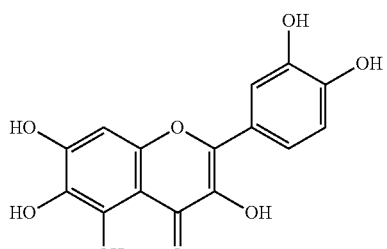

(9)

Example 8

Manufacturing of Charging Roller 8

Except that 15 parts by mass of epicatechin for use in manufacturing the rubber compound A was changed to 16 parts by mass of 3,5,7,3',4',5'-hexahydroxyflavone (a compound represented by formula (10)), a charging roller 8 was obtained by the same method as in Example 1.

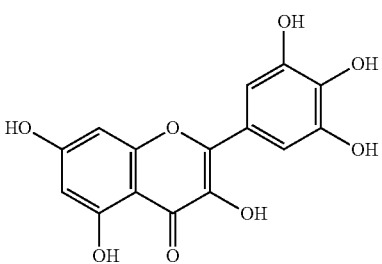

(10)

Example 9

Manufacturing of Charging Roller 9

Except that 15 parts by mass of epicatechin for use in manufacturing the rubber compound A was changed to 11 parts by mass of 5,7,4'-trihydroxyflavone (a compound represented by formula (13)), a charging roller 9 was obtained by the same method as in Example 1.

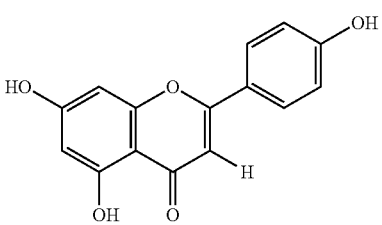

(13)

Example 10

Manufacturing of Charging Roller 10

Except that 15 parts by mass of epicatechin for use in manufacturing the rubber compound A was changed to 7 parts by mass of 3,7,3',4'-tetrahydroxyflavone (a compound represented by formula (14)), a charging roller 10 was obtained by the same method as in Example 1.

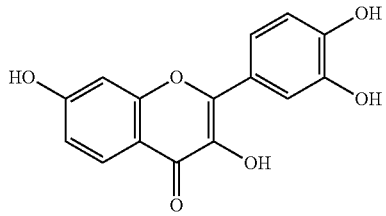
(14)

Example 11

Manufacturing of Charging Roller 11

Except that 15 parts by mass of epicatechin for use in manufacturing the rubber compound A was changed to 18 parts by mass of 5,7,3',4'-tetrahydroxyflavone (a compound represented by formula (15)), a charging roller 11 was obtained by the same method as in Example 1.

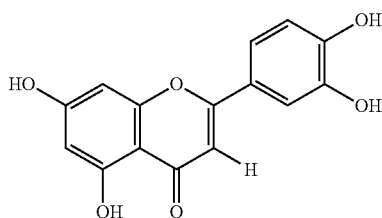
(15)

Example 12

Manufacturing of Charging Roller 12

Except that 15 parts by mass of epicatechin for use in manufacturing the rubber compound A was changed to 14 parts by mass of 3,5,7,4'-tetrahydroxyflavone (a compound represented by formula (16)), a charging roller 12 was obtained by the same method as in Example 1.

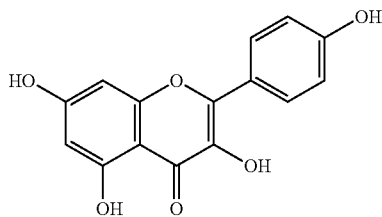
(16)

Example 13

Manufacturing of Charging Roller 13

Except that 15 parts by mass of epicatechin for use in manufacturing the rubber compound A was changed to 15 parts by mass of 3,5,7,3',4'-pentahydroxyflavone (a compound represented by formula (17)), a charging roller 13 was obtained by the same method as in Example 1.

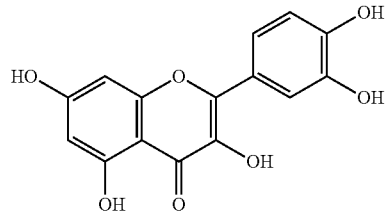
(17)

Example 14

Manufacturing of Charging Roller 14

Except that 15 parts by mass of epicatechin for use in manufacturing the rubber compound A was changed to 8 parts by mass of 3,5,7,2',4'-pentahydroxyflavone (a compound represented by formula (18)), a charging roller 14 was obtained by the same method as in Example 1.

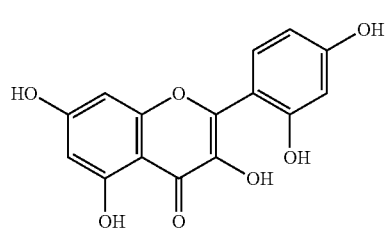
(18)

Example 15

Manufacturing of Charging Roller 15

Except that 15 parts by mass of epicatechin for use in manufacturing the rubber compound A was changed to 13 parts by mass of 7,8-dihydroxyflavone (a compound represented by formula (19)), a charging roller 15 was obtained by the same method as in Example 1.

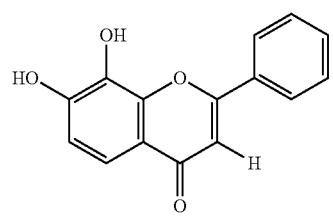
(19)

Example 16

Manufacturing of Charging Roller 16

Except that 15 parts by mass of epicatechin for use in manufacturing the rubber compound A was changed to 17 parts by mass of 5,7-dihydroxyflavone (a compound represented by formula (20)), a charging roller 16 was obtained by the same method as in Example 1.

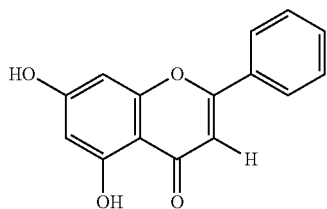
(20)

Example 17

Manufacturing of Charging Roller 17

Except that 15 parts by mass of epicatechin for use in manufacturing the rubber compound A was changed to 19 parts by mass of 5,7-dihydroxy-4'-methoxyflavone (a compound represented by formula (21)), a charging roller 17 was obtained by the same method as in Example 1.

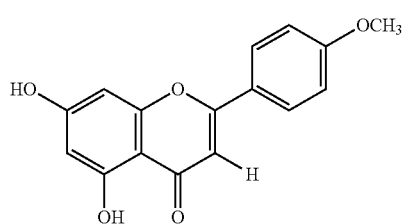
(21)

Example 18

Manufacturing of Charging Roller 18

Except that 15 parts by mass of epicatechin for use in manufacturing the rubber compound A was changed to 14 parts by mass of 4'-methoxy-3,5,7-trihydroxyflavone (a compound represented by formula (22)), a charging roller 18 was obtained by the same method as in Example 1.

(22)

Example 19

Manufacturing of Charging Roller 19

Except that 15 parts by mass of epicatechin for use in manufacturing the rubber compound A was changed to 10 parts by mass of 3-methoxy-5,7,3',4'-tetrahydroxyflavone (a compound represented by formula (23)), a charging roller 19 was obtained by the same method as in Example 1.

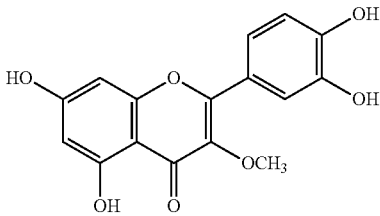
(23)

Example 20

Manufacturing of Charging Roller 20

The epichlorohydrin-ethylene oxide-allyl glycidyl ether copolymer (EP:EO:AGE=37:55:7.5) in an amount of 100 parts by mass for use in manufacturing the rubber compound A was changed to 100 parts by mass of an epichlorohydrin polymer. Furthermore, in manufacturing the rubber compound A, 20 parts by mass of carbon black (trade name: 7360SB) was used instead of tetrabutyl ammonium perchlorate and polyadipate. And in manufacturing the rubber compound B, 1 part by mass of dicumyl peroxide as replacement of the materials shown in Table 2 was kneaded with the rubber compound A. Except for these, a charging roller 20 was obtained by the same method as in Example 1.

Example 21

Manufacturing of Charging Roller 21

The epichlorohydrin-ethylene oxide-allyl glycidyl ether copolymer (EP:EO:AGE=37:55:7.5) in an amount of 100 parts by mass for use in manufacturing the rubber compound A was changed to 100 parts by mass of an epichlorohydrin-ethylene oxide copolymer (EP:EO=60:40). Furthermore, in manufacturing the rubber compound B, 1 part by mass of dicumyl peroxide as replacement of the materials shown in Table 2 was kneaded with the rubber compound A. Except for these, a charging roller 21 was obtained by the same method as in Example 1.

Comparative Example 1

Manufacturing of Charging Roller 22

Except that 15 parts by mass of epicatechin for use in manufacturing the rubber compound A was changed to 15 parts by mass of 3-hydroxyflavone (a compound represented by formula (24)), a charging roller 22 was obtained by the same method as in Example 1.

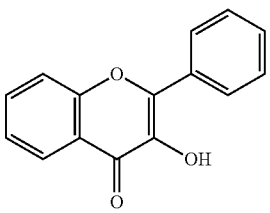
(24)

Comparative Example 2

Manufacturing of Charging Roller 23

Except that 15 parts by mass of epicatechin for use in manufacturing the rubber compound A was changed to 9 parts by mass of 5-hydroxyflavone (a compound represented by formula (25)), a charging roller 23 was obtained by the same method as in Example 1.

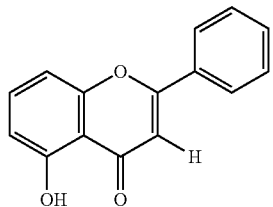

(25)

Comparative Example 3

Manufacturing of Charging Roller 24

Except that 15 parts by mass of epicatechin for use in manufacturing the rubber compound A was changed to 8 parts by mass of 6-hydroxyflavone (a compound represented by formula (26)), a charging roller 24 was obtained by the same method as in Example 1.

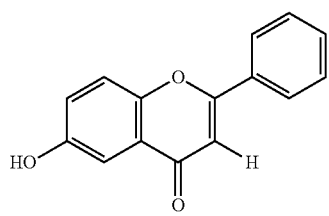

(26)

Comparative Example 4

Manufacturing of Charging Roller 25

Except that 15 parts by mass of epicatechin for use in manufacturing the rubber compound A was changed to 12 parts by mass of 6-methoxyflavone (a compound represented by formula (27)), a charging roller 25 was obtained by the same method as in Example 1.

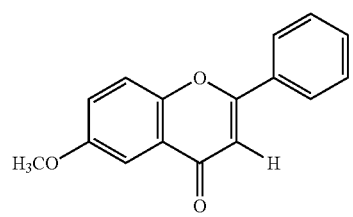

(27)

Comparative Example 5

Manufacturing of Charging Roller 26

Except that 15 parts by mass of epicatechin for use in manufacturing the rubber compound A was changed to 13 parts by mass of flavone (a compound represented by formula (28)), a charging roller 26 was obtained by the same method as in Example 1.

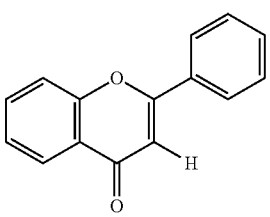

(28)

Comparative Example 6

Manufacturing of Charging Roller 27

Except that 15 parts by mass of epicatechin for use in manufacturing the rubber compound A was changed to 15 parts by mass of flavan (a compound represented by formula (29)), a charging roller 27 was obtained by the same method as in Example 1.

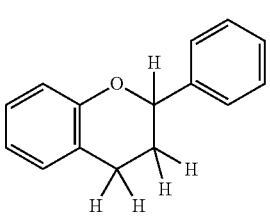

(29)

Comparative Example 7

Manufacturing of Charging Roller 28

Except that 15 parts by mass of epicatechin for use in manufacturing the rubber compound A was changed to 10 parts by mass of 5-hydroxyflavan (a compound represented by formula (30)), a charging roller 28 was obtained by the same method as in Example 1.

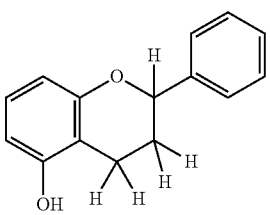

(30)

<Evaluation Method>
(Evaluation of Banding Image)

The produced charging roller assembled into an electrophotographic apparatus was subject to a durability test under a low-temperature and low-humidity environment (15° C./10% RH (relative humidity)). For use as the electrophotographic apparatus, a color laser jet printer made by Canon (trade name: SATERA LBP 5400) was modified to have a recording medium output speed of 200 mm/sec (A4 vertical output). The image resolution was 600 dpi, and the output DC voltage of primary charging was −1,100 V. As the electrophotographic process cartridge, the electrophotographic process cartridge for the printer was used. A half tone image was outputted for the evaluation of the unevenness of streak-like image existing on the halftone image. As the image evaluation, after 10 sheets of paper were initially fed through, a banding image was evaluated using the image of the 10th sheet according to the following criteria:

Rank 1: no occurrence of streak-like image;

Rank 2: occurrence of only a slightly streak-like image; and

Rank 3: highly visible streak-like image with reduced image quality.

<Measurement of Tan δ of Charging Member (Tan δ of Elastic Layer Including Surface Layer Part)>

The tan δ of the produced charging roller was measured with a viscoelasticity measurement device (viscoelasticity spectrometer, trade name: EXSTAR 6000DMS, made by Eko instruments). More specifically, the charging roller was partially cut out to form a mini roller for the measurement, as shown in FIG. 6. The measurement conditions were set to a compression mode, a frequency of 100 Hz, and a dynamic strain of 0.2%.

For each of the produced charging rollers in Examples 1 to 21 and Comparative Examples 1 to 7, the evaluation of the banding image and the measurement of tan δ of the charging roller were performed as described above.

The evaluation results are shown in Table 4. In Table 4, "phr" means the addition amount (parts by mass) relative to 100 parts by mass of a resin having an epichlorohydrin chain in the molecular structure.

TABLE 4

| | Charging roller | Flavonoid compound | | Image rank | tan δ |
| --- | --- | --- | --- | --- | --- |
| | | Material name | Addition amount (phr) | | |
| Example | | | | | |
| 1 | 1 | Epicatechin | 15 | 1 | 0.25 |
| 2 | 2 | Epigallocatechin | 10 | 1 | 0.24 |
| 3 | 3 | Epicatechin gallate | 12 | 1 | 0.23 |
| 4 | 4 | Epigallocatechin gallate | 15 | 1 | 0.24 |
| 5 | 5 | Naringenin | 9 | 1 | 0.25 |
| 6 | 6 | Hesperetin | 14 | 1 | 0.23 |
| 7 | 7 | 3,5,6,7,3',4'-Hexahydroxyflavone | 8 | 1 | 0.26 |
| 8 | 8 | 3,5,7,3',4',5'-Hexahydroxyflavone | 16 | 1 | 0.21 |
| 9 | 9 | 5,7,4'-Trihydroxyflavone | 11 | 1 | 0.20 |
| 10 | 10 | 3,7,3',4'-Tetrahydroxyflavone | 7 | 1 | 0.19 |
| 11 | 11 | 5,7,3',4'-Tetrahydroxyflavone | 18 | 1 | 0.18 |
| 12 | 12 | 3,5,7,4'-Tetrahydroxyflavone | 14 | 1 | 0.17 |
| 13 | 13 | 3,5,7,3',4'-Pentahydroxyflavone | 15 | 1 | 0.18 |
| 14 | 14 | 3,5,7,2',4'-Pentahydroxyflavone | 8 | 1 | 0.15 |
| 15 | 15 | 7,8-Dihydroxyflavone | 13 | 2 | 0.14 |
| 16 | 16 | 5,7-Dihydroxyflavone | 17 | 2 | 0.13 |
| 17 | 17 | 5,7-Dihydroxy-4'-methoxyflavone | 19 | 2 | 0.12 |
| 18 | 18 | 4'-Methoxy-3,5,7-trihydroxyflavone | 14 | 2 | 0.13 |
| 19 | 19 | 3-Methoxy-5,7,3',4'-tetrahydroxyflavone | 10 | 2 | 0.11 |
| 20 | 20 | Epicatechin | 15 | 2 | 0.14 |
| 21 | 21 | Epicatechin | 15 | 2 | 0.13 |
| Comparative Example | | | | | |
| 1 | 22 | 3-Hydroxyflavone | 15 | 3 | 0.08 |
| 2 | 23 | 5-Hydroxyflavone | 9 | 3 | 0.07 |
| 3 | 24 | 6-Hydroxyflavone | 8 | 3 | 0.09 |
| 4 | 25 | 6-Methoxyflavone | 12 | 3 | 0.07 |
| 5 | 26 | Flavone | 13 | 3 | 0.06 |
| 6 | 27 | Flavane | 15 | 3 | 0.07 |
| 7 | 28 | 5-Hydroxyflavane | 10 | 3 | 0.08 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

REFERENCE SIGNS LIST

1 CONDUCTIVE SUPPORT
2 CONDUCTIVE ELASTIC LAYER
3 SURFACE LAYER
4 RESIN HAVING EPICHLOROHYDRIN CHAIN IN MOLECULAR STRUCTURE
5 SPECIFIC FLAVONOID COMPOUND HAVING TWO OR MORE HYDROXYL GROUPS IN MOLECULAR STRUCTURE
6 HYDROGEN BOND
7 CHARGING ROLLER
8 ALUMINUM DRUM
9 PHOTOSENSITIVE MEMBER

- 10 LATENT IMAGE FORMING DEVICE
- 11 DEVELOPING ROLLER
- 12 TRANSFERRING ROLLER
- 13 TRANSFER MATERIAL
- 14 CLEANING MEMBER
- 15 FIXING DEVICE
- 16 MINI ROLLER
- 17 SHAFT BEARING
- 18 SENSOR OF VISCOELASTICITY MEASUREMENT DEVICE

What is claimed is:

1. A charging member comprising:
an electro-conductive support;
an electro-conductive elastic layer; and
a surface layer, wherein
the electro-conductive elastic layer comprises a resin having an epichlorohydrin chain in the molecular structure, and a compound represented by formula (3)

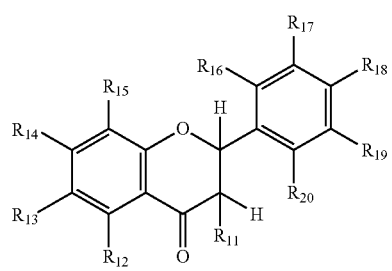

(3)

where $R_{11}$ to $R_{20}$ independently represent a member selected from the group consisting of a hydrogen atom, a hydroxyl group, and a methoxy group, and at least two of $R_{11}$ to $R_{20}$ are hydroxyl groups.

2. The charging member according to claim 1, wherein the compound represented by formula (3) is selected from the group consisting of formulae (11) and (12)

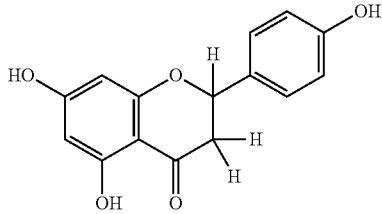

(11)

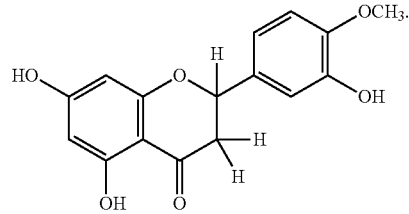

(12)

3. The charging member according to claim 1, wherein the resin is a copolymer having an epichlorohydrin chain, an ethylene oxide chain, and an allyl glycidyl ether chain in the molecular structure.

4. An electrophotographic image forming apparatus comprising an electrophotographic photosensitive member and a charging member according to claim 1 arranged for charging the electrophotographic photosensitive member.

5. A process cartridge integrally comprising:
a charging member according to claim 1; and
at least one member selected from the group consisting of an electrophotographic photosensitive member, a developing unit, a transferring unit and a cleaning unit, wherein
the process cartridge is detachably mountable to an electrophotographic image forming apparatus.

* * * * *